(12) United States Patent
Masu

(10) Patent No.: US 10,787,190 B2
(45) Date of Patent: Sep. 29, 2020

(54) STEERING DEVICE

(71) Applicant: HONDA MOTOR CO., LTD., Minato-ku, Tokyo (JP)

(72) Inventor: Shintaro Masu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 16/103,952

(22) Filed: Aug. 15, 2018

(65) Prior Publication Data

US 2019/0106141 A1 Apr. 11, 2019

(30) Foreign Application Priority Data

Oct. 5, 2017 (JP) .................................. 2017-195197

(51) Int. Cl.
  *B62D 1/12* (2006.01)
  *B60N 2/75* (2018.01)
  *B62D 1/02* (2006.01)

(52) U.S. Cl.
  CPC ................. *B62D 1/12* (2013.01); *B60N 2/79* (2018.02); *B62D 1/02* (2013.01)

(58) Field of Classification Search
  CPC . B62D 1/12; B62D 1/183; B62D 1/02; B62D 1/18; B62D 1/181; B60N 2/79
  USPC ....................................................... 180/334
  See application file for complete search history.

(56) References Cited

U.S. PATENT DOCUMENTS

| | | | |
|---|---|---|---|
| 6,585,073 B2 * | 7/2003 | Lorenz | B60R 21/09 180/332 |
| 2004/0129486 A1 | 7/2004 | Chernoff et al. | |
| 2004/0133322 A1 * | 7/2004 | Chernoff | B60K 26/02 701/41 |
| 2011/0025108 A1 | 2/2011 | Wihinen | |
| 2019/0367072 A1 * | 12/2019 | Hansen | B60R 7/04 |

FOREIGN PATENT DOCUMENTS

| | | |
|---|---|---|
| JP | 08-034353 | 2/1996 |
| JP | 2000-066753 | 3/2000 |
| JP | 2005-149058 | 6/2005 |
| JP | 2005149058 A * | 6/2005 |

(Continued)

OTHER PUBLICATIONS

Machine Translation of JP 2005149058 (Year: 2005).*

(Continued)

*Primary Examiner* — Paul N Dickson
*Assistant Examiner* — Kurtis Nielson
(74) *Attorney, Agent, or Firm* — Amin, Turocy & Watson, LLP

(57) ABSTRACT

The present invention provides a steering device that includes: a pair of armrests which are mounted on left and right sides of a seat for a vehicle and on which arms of a sitter are placed; and steering units which are provided on the pair of armrests, are formed to be grasped by the sitter, and are configured to change a steering angle of the vehicle by moving in a forward and backward direction of the seat. The steering units are formed to be movable between an operation position at which the sitter grasps and operates the steering units and a storage position at which the steering units are stored in the armrests, and are disposed at the storage position when a predetermined condition is established.

11 Claims, 6 Drawing Sheets

(56) References Cited

FOREIGN PATENT DOCUMENTS

| JP | 2007-244241 | 9/2007 |
| JP | 2011-178202 | 9/2011 |
| JP | 2015-040038 | 3/2015 |
| JP | 2016-168972 | 9/2016 |
| JP | 2017-159840 | 9/2017 |
| WO | 2017/158726 | 9/2017 |

OTHER PUBLICATIONS

Machine Translation of WO 2017158726 (Year: 2017).*
Japanese Office Action for Japanese Patent Application No. 2017-195197 dated Mar. 5, 2019.
"Introducing the Nissan IDS Concept", 36 seconds-2minutes 15 seconds, Oct. 27, 2015, Nissan Motor Co., Ltd, Internet <URL:https://www.youtube.com/watch?v=h-TLo86K7Ck>.
Japanese Notice of Allowance for Japanese Patent Application No. 2017-195197 dated Aug. 20, 2019.

* cited by examiner

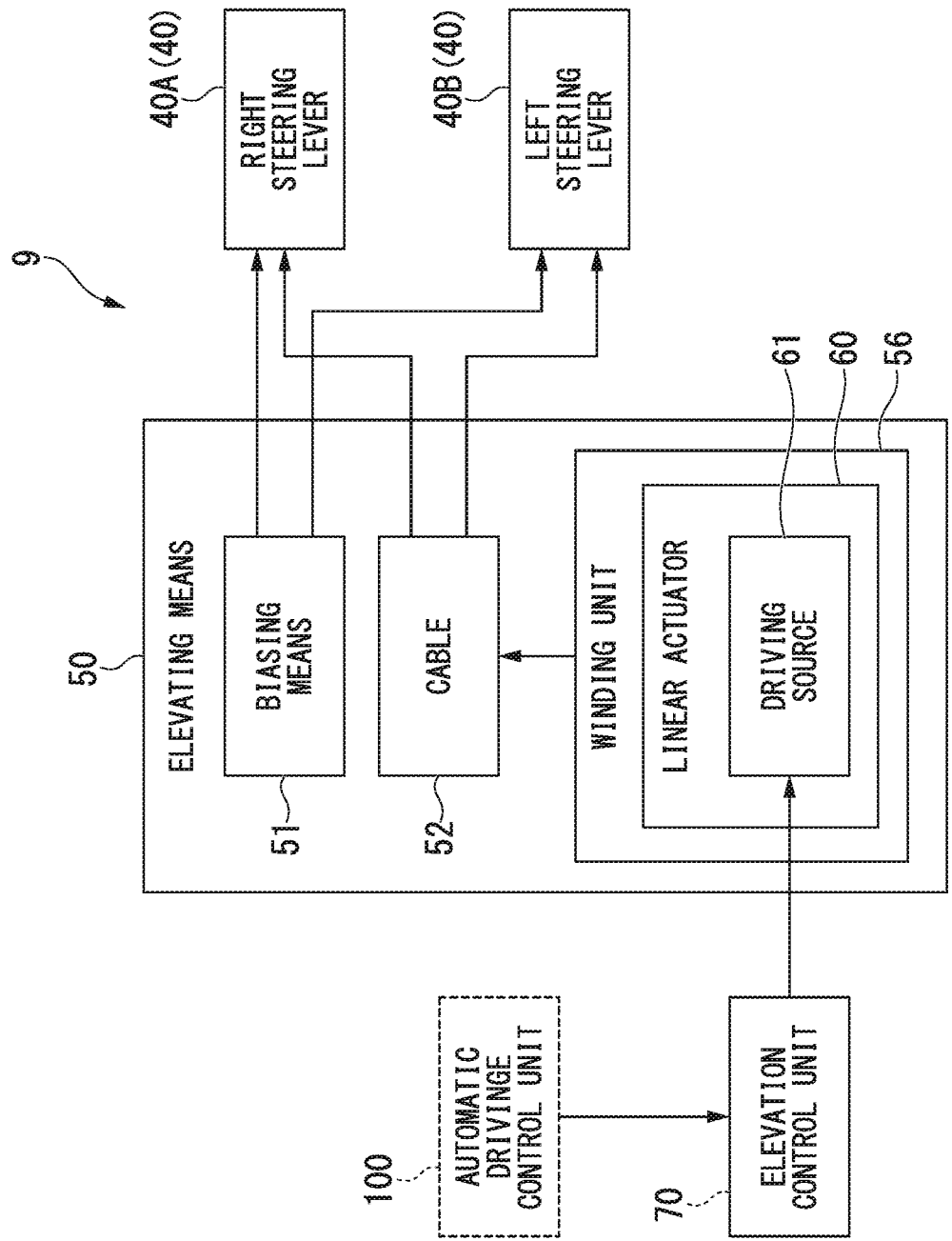

STEERING DEVICE

CROSS-REFERENCE TO RELATED APPLICATION

Priority is claimed on Japanese Patent Application No. 2017-195197, filed Oct. 5, 2017, the content of which is incorporated herein by reference.

BACKGROUND OF THE INVENTION

Field of the Invention

The present invention relates to a steering device.

Description of Related Art

In the past, steering devices have been used to perform a change operation of a steering angle of a vehicle. Such a steering device is, for instance, a steering device (a steering system) disclosed in Japanese Unexamined Patent Application, First Publication No. 2016-168972.

The steering device of Japanese Unexamined Patent Application, First Publication No. 2016-168972 is installed in a vehicle that can switch between automatic driving and manual driving. During the manual driving, the steering device is disposed at a position suitable for driving (a position suitable for the change operation of the steering angle). When a driving state of the vehicle is changed from the manual driving to the automatic driving, the steering device moves from the position suitable for driving to a position at which a relaxed posture can be assumed.

SUMMARY OF THE INVENTION

However, the steering device of Japanese Unexamined Patent Application, First Publication No. 2016-168972 is disposed in front of a driver during both the automatic driving and the manual driving. For this reason, when the driver relaxes by leaning back against a seat during the automatic driving, and then the driving state of the vehicle is changed from the automatic driving to the manual driving, the driver has to get up to grasp the steering device. Therefore, it is difficult to promptly grasp the steering device and to react instantly to the manual driving. Thus, steering devices that enable the driver to react instantly to manual driving when the driving state of a vehicle is changed from automatic driving to the manual driving are being investigated. Furthermore, when an occupant does not need to operate the steering device, for instance, during the automatic driving of the vehicle, it is desirable for the steering device to be able to be out of the way.

The present invention was made in view of such conventional problems, and is directed to providing a steering device which enables a sitter to instantly respond to a situation in which a driving state of a vehicle is changed from automatic driving to manual driving and is out of the way when an occupant does not need to operate the steering device.

According to a first aspect of the present invention, a steering device includes: a pair of armrests which are mounted on left and right sides of a seat for a vehicle and on which arms of a sitter are placed; and steering means which are provided on the pair of armrests, are formed to be grasped by the sitter, and are configured to change a steering angle of the vehicle by moving in a forward and backward direction of the seat. The steering means are formed to be movable between an operation position at which the sitter grasps and operates the steering means and a storage position at which the steering means are stored in the armrests, and are disposed at the storage position when a predetermined condition is established.

According to a second aspect of the present invention, in the steering device according to the first aspect of the present invention, the steering means are disposed at the storage position during automatic driving of the vehicle.

According to a third aspect of the present invention, in the steering device according to the first or second aspect of the present invention, the steering device further includes a drive unit that is provided on a seat back of the seat and displaces the pair of steering means between the operation position and the storage position.

In the first aspect, the pair of steering means formed to be able to be grasped by the sitter are provided on the pair of armrests. Thereby, the steering device is disposed at a position suitable for a change operation of a steering angle during both manual driving and automatic driving of the vehicle. For this reason, when the sitter relaxes by leaning back against the seat during the automatic driving and then a driving state of the vehicle is changed from the automatic driving to the manual driving, the sitter can promptly grasp the steering means without getting up. Therefore, the steering device enables the sitter to instantly cope with the situation in which the driving state of the vehicle is changed from the automatic driving to the manual driving.

Further, in the first aspect, the steering means are disposed at the storage position when a predetermined condition is established. Thereby, when the predetermined condition is established, the steering means can be disposed at a position at which they are out of the way of an occupant. Therefore, the steering device that is out of the way when the sitter does not need to operate the steering device can be provided.

In the second aspect, the steering means are disposed at the storage position during the automatic driving of the vehicle. For this reason, when the sitter does not need to operate the steering device during the automatic driving, the steering means are stored. Therefore, it is possible to inhibit the steering means from getting in the way during the automatic driving, and to inhibit the occupant from coming into contact with the steering means and erroneously operating the steering device during the automatic driving.

In the third aspect, the steering device includes the drive unit that displaces the pair of steering means between the operation position and the storage position.

Thereby, the pair of steering means can be displaced between the operation position and the storage position by the single drive unit. Therefore, in comparison with a case in which, for example, one drive unit is provided on each of the steering means, the number of components can be reduced.

BRIEF DESCRIPTION OF THE DRAWINGS

FIG. 6 is a block diagram showing a constitution of the steering device of the embodiment.

DETAILED DESCRIPTION OF THE INVENTION

Next, an embodiment of the present invention will be described on the basis of the drawings.

Figure 1:
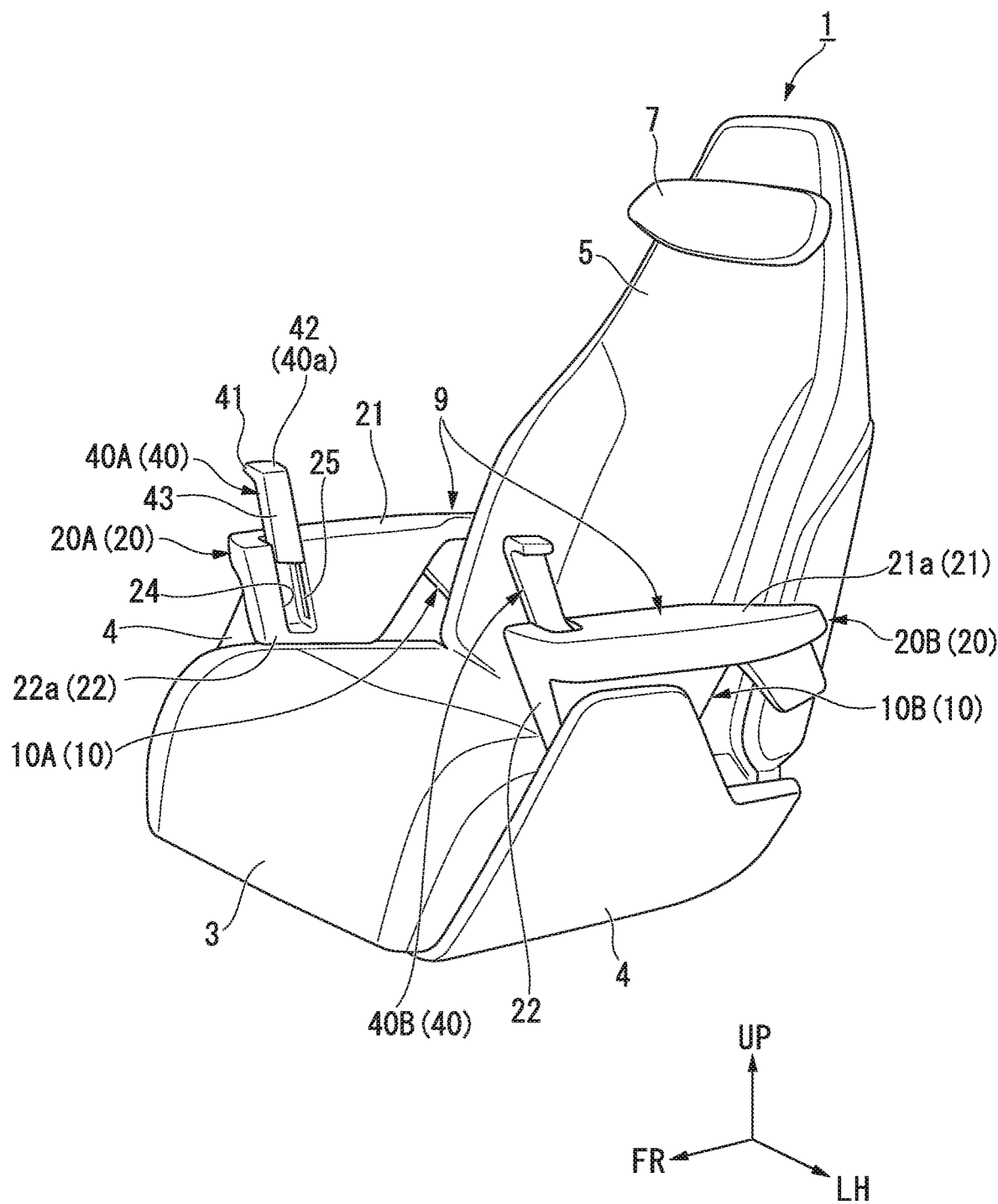
FIG. 1 is a perspective view of a seat having a steering device of an embodiment.

FIG. 1 is a perspective view of a seat 1 having a steering device 9 of an embodiment.

As shown in FIG. 1, the seat 1 of the embodiment is a seat for a vehicle. The seat 1 is mounted, for instance, in a vehicle in which a driving mode can be switched between an automatic driving mode and a manual driving mode. In automatic driving, the vehicle determines the situation of itself and its surroundings to perform driving. In manual driving, that a driver drives a vehicle. The seat 1 is a seat in which the driver sits.

The seat 1 includes a seat cushion 3 that supports the buttocks of the driver, a seat back 5 that is connected to a rear end of the seat cushion 3 and supports the waist and back of the driver, a headrest 7 that is connected to an upper portion of the seat back 5 and supports the neck and head of the driver, and the steering device 9 that is used for a change operation of a steering angle of the vehicle. In the following description, directions of front, rear, up, down, left, and right are the same as directions of front, rear, up, down, left, and right in the seat 1. In the drawings, an arrow UP indicates an upper side, an arrow FR indicates a front side, an arrow LH indicates a left side. A leftward and rightward direction is identical to a width direction of the seat 1. A forward and backward direction is identical to a forward and backward direction of the vehicle.

Figure 2:
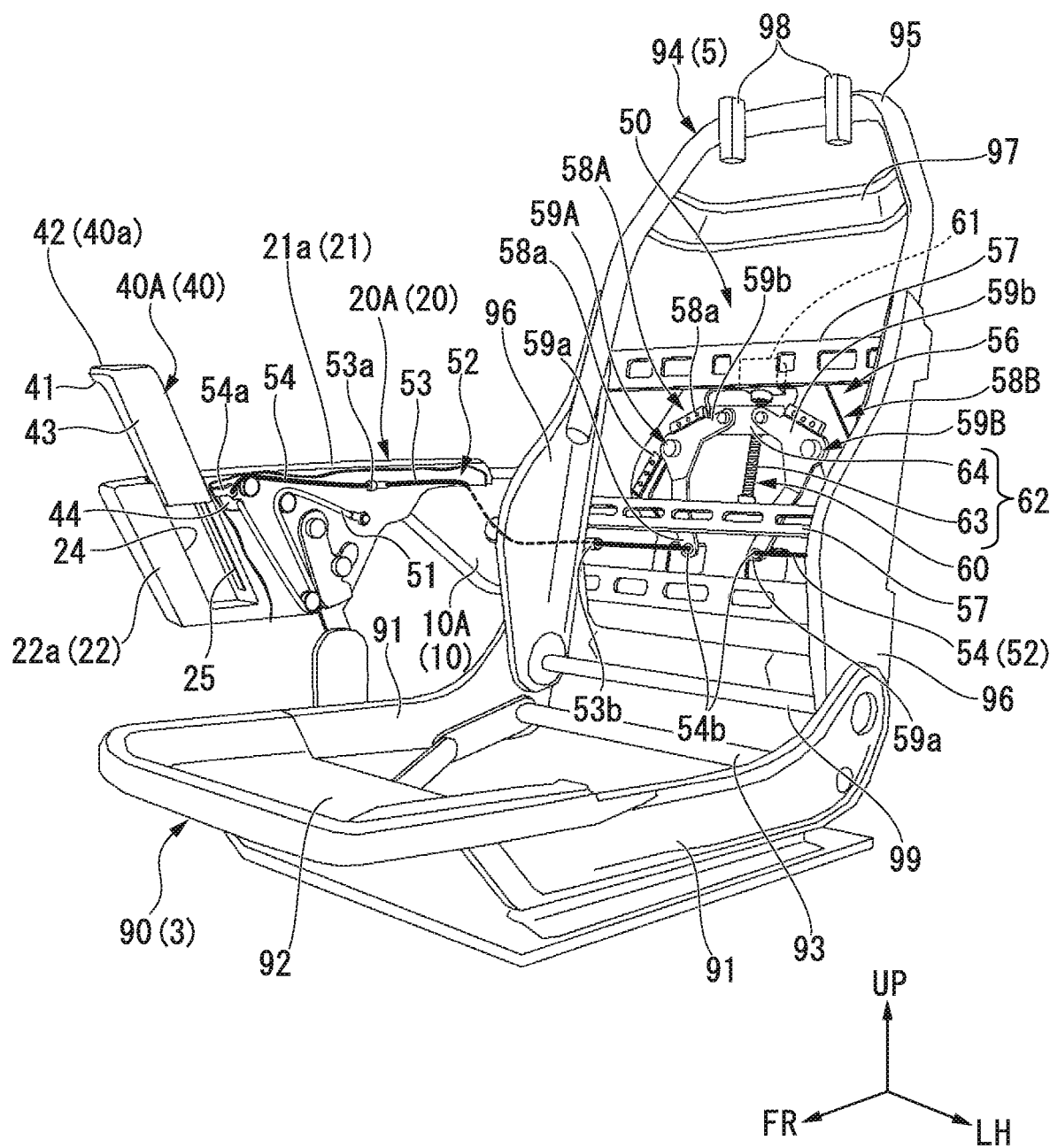
FIG. 2 is a perspective view showing an internal structure of the seat of the embodiment.

FIG. 2 is a perspective view showing an internal structure of the seat 1 of the embodiment. In FIG. 2, an armrest 20A (to be described below) is partly cut away, and thereby an internal structure of the armrest 20A is shown (also the same as in FIG. 5).

As shown in FIGS. 1 and 2, the seat cushion 3 includes a cushion frame 90 that forms a skeleton, a pad (not shown) that is formed of, for instance, a urethane foam and is mounted on the cushion frame 90, and a seat cover that is formed of, for instance, a synthetic fiber or leather and covers the cushion frame 90 and the pad. A pair of side supports 4 are provided at both left and right ends of the seat cushion 3. The pair of side supports 4 protrudes upward from both the left and right ends of the seat cushion 3.

As shown in FIG. 2, the cushion frame 90 has a pair of left and right side plates 91 that extend in a forward and backward direction, a seat pan 92 that connects front portions of the pair of side plates 91, and a rear pipe 93 that connects rear portions of the pair of side plates 91. The cushion frame 90 is formed in a rectangular frame shape by the pair of side plates 91, the seat pan 92, and the rear pipe 93.

As shown in FIGS. 1 and 2, the seat back 5 is connected to a rear end of the seat cushion 3 to be tiltable in the forward and backward direction. The seat back 5 includes a back frame 94 that forms a skeleton, a pad (not shown) that is formed of, for instance, a urethane foam and is mounted on a front portion of the back frame 94, and a seat cover that is formed of, for instance, a synthetic resin or leather and covers the back frame 94 and the pad.

As shown in FIG. 2, the back frame 94 has a frame pipe 95 that extends in a U shape that opens downward when viewed in the forward and backward direction, a pair of left and right side plates 96 that are fixed to lower portions of both left and right lateral portions of the frame pipe 95, and an upper cross member 97 that is laid across upper portions of both the left and right lateral portions of the frame pipe 95. A pair of support pipes 98, which elevatably support the headrest 7, are provided at an upper portion of the frame pipe 95 on left and right sides at an interval. Lower ends of the pair of side plates 96 extend below the frame pipe 95, and are disposed inside rear ends of the pair of side plates 91 of the cushion frame 90. The lower ends of the side plates 96 are tiltably connected to the rear ends of the pair of side plates 91 of the cushion frame 90 via a tilting shaft 99. The tilting shaft 99 forms a shaft of a reclining mechanism, and extends in a leftward and rightward direction to be laid across the pair of side plates 91 of the cushion frame 90.

As shown in FIG. 1, the headrest 7 is disposed in front of the upper portion of the seat back 5, and is supported to be movable up and down relative to the seat back 5. For example, the headrest 7 includes a frame (not shown), a pad (not shown), and a headrest cover.

The steering device 9 includes a pair of base members 10A and 10B, a pair of armrests 20A and 20B, a pair of steering levers (steering means) 40A and 40B, elevating means 50 (see FIG. 2), and an elevation control unit 70 (see FIG. 6). Sensors, which detect operation amounts or presence/absence of operations of the steering levers 40A and 40B, are mounted in the steering device 9. Results detected by the sensors are output to, for instance, a steering system. The steering system includes, for instance, a steering ECU and an electric motor. For example, the electric motor applies a force to a rack and pinion mechanism, and changes directions of front wheels (steered wheels) of the vehicle. For example, the steering ECU drives the electric motor according to information input from the steering device 9, and changes the directions of the front wheels.

The base members 10A and 10B are provided on left and right sides of the seat 1 (both left and right sides of the seat cushion 3 and the seat back 5). That is, the pair of base members 10A and 10B are provided to sandwich the sitter of the seat 1 from both the left and right sides. The pair of base members 10A and 10B are a right base member 10A provided on the right side of the seat 1, and a left base member 10B provided on the left side of the seat 1. Front portions of the pair of base members 10A and 10B are supported by the side supports 4. Rear portions of the pair of base members 10A and 10B are supported by lateral portions of the seat back 5 in the leftward and rightward direction. Hereinafter, when the base members 10A and 10B are not differentiated from each other, they are simply indicated as base members 10.

Both arms of the driver are placed on the pair of armrests 20A and 20B. The pair of armrests 20A and 20B are a right armrest 20A provided on the right side of the seat 1, and a left armrest 20B provided on the left side of the seat 1. The right armrest 20A is supported by the right base member 10A to be movable in the forward and backward direction. The left armrest 20B is supported by the left base member 10B to be movable in the forward and backward direction. Thereby, the pair of armrests 20A and 20B are mounted on the left and right sides of the seat 1 to be movable in the forward and backward direction. Hereinafter, when the armrests 20A and 20B are not differentiated from each other, they are simply indicated as armrests 20.

Each of the armrests 20 has a cavity inside. Each of the armrests 20 includes a top wall part 21 and a sidewall part 22. For example, the top wall part 21 and the sidewall part 22 are integrally formed.

The top wall parts 21 are provided at upper portions of the armrests 20. The top wall parts 21 extend in the forward and backward direction. The forearms of the driver are placed on upper surfaces 21a of the top wall parts 21. The top wall parts 21 are supported by the base members 10 to be movable (slidable) in the forward and backward direction.

The sidewall parts 22 extend downward from the top wall parts 21. The sidewall parts 22 are connected from front ends to middle portions of the top wall parts 21. The sidewall parts 22 are provided around a seating space of the seat 1 with respect to the base members 10. Thereby, each of the sidewall parts 22 is disposed between the sitter in the seat 1 and the corresponding base member 10. Lateral surfaces 22a, which face the seating space of the seat 1 and extend in the forward and backward direction and an upward and downward direction, are formed at the sidewall parts 22.

Storage parts 24 are provided at front portions of the armrests 20. The steering levers 40A and 40B are slidably stored in the storage parts 24. The storage parts 24 are formed at the sidewall parts 22 in groove shapes. The storage parts 24 are inclined with respect to the upward and downward direction to be directed forward and upward from below and extend in a linear shape. Upper ends of the storage parts 24 are open on the upper surfaces 21a of the top wall part 21. Lengths of the storage parts 24 are nearly identical to those of the steering levers 40A and 40B. Slits 25, which extend in a direction in which each of the storage parts 24 extends, are formed in wall surfaces of each of the storage parts 24. The slits 25 are formed in both the wall surface directed forward and the wall surface directed backward, among the wall surfaces of each of the storage parts 24.

Figure 3:
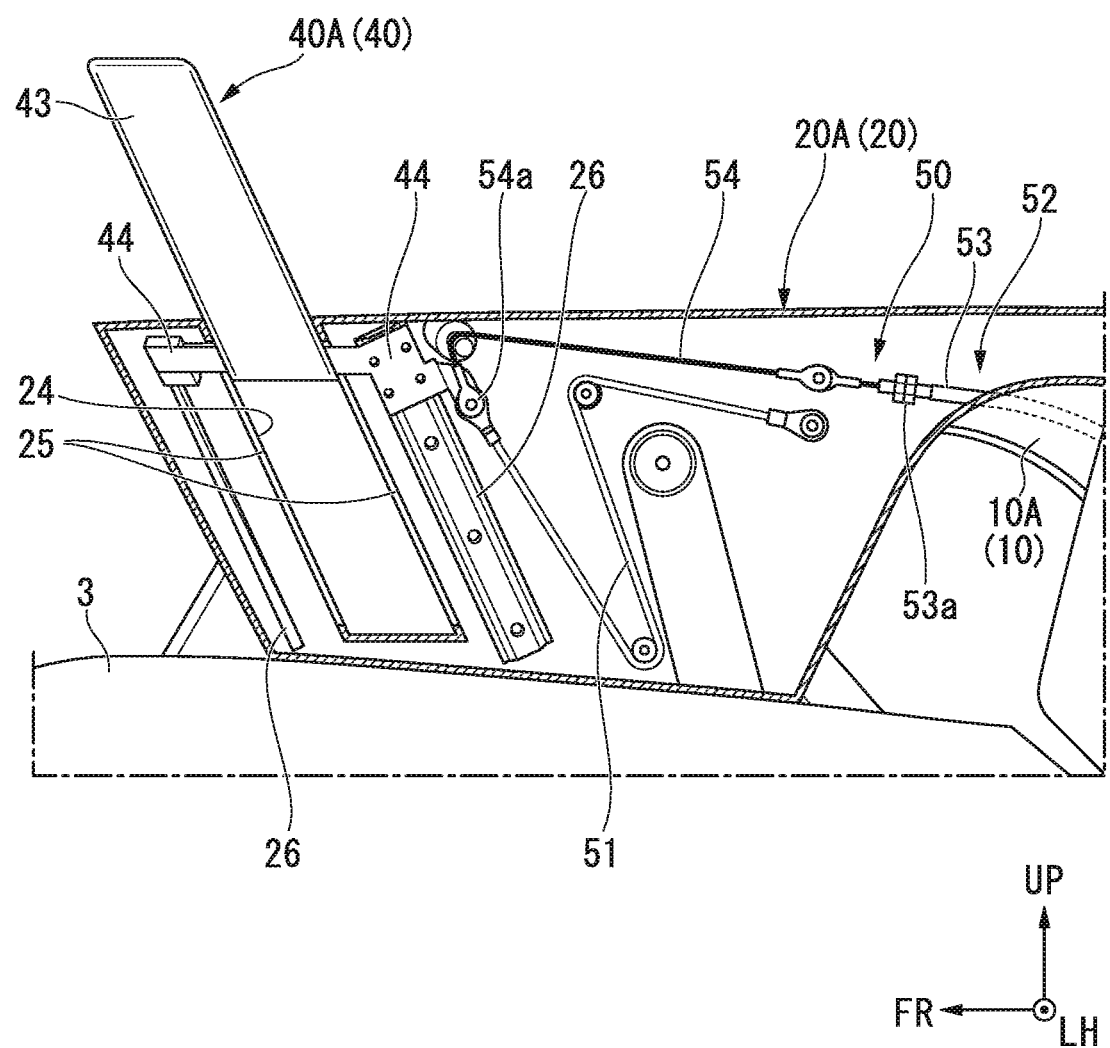
FIG. 3 is a side view showing an internal structure of a right armrest of the embodiment.

FIG. 3 is a side view showing an internal structure of the right armrest 20A of the embodiment.

As shown in FIG. 3, a pair of rails 26 are disposed inside the armrest 20. The pair of rails 26 are provided on front and rear sides across each of the storage parts 24. The rails 26 extend in parallel to the direction in which each of the storage parts 24 extends.

As shown in FIG. 1, the pair of steering levers 40A and 40B are provided on the armrests 20. The pair of steering levers 40A and 40B are a right steering lever 40A provided on the right armrest 20A and a left steering lever 40B provided on the left armrest 20B. The pair of steering levers 40A and 40B are displaced in the forward and backward direction by an operation (a pushing/pulling operation) of the driver along with the armrests 20. The pair of steering levers 40A and 40B are displaced in the forward and backward direction, thereby changing the steering angle of the vehicle. Hereinafter, when the steering levers 40A and 40B are not differentiated from each other, they are simply indicated as steering levers 40.

Each of the steering levers 40 includes a lever main body 43 and a pair of sliders 44 (see FIG. 3). The lever main body 43 is provided to be able to be grasped by a hand of the driver. The lever main body 43 is formed in a shape that corresponds to a shape of the storage part 24 of each of the armrests 20. The lever main body 43 is formed in a shape in which it can slide in the storage part 24 of each of the armrests 20.

Figure 4:
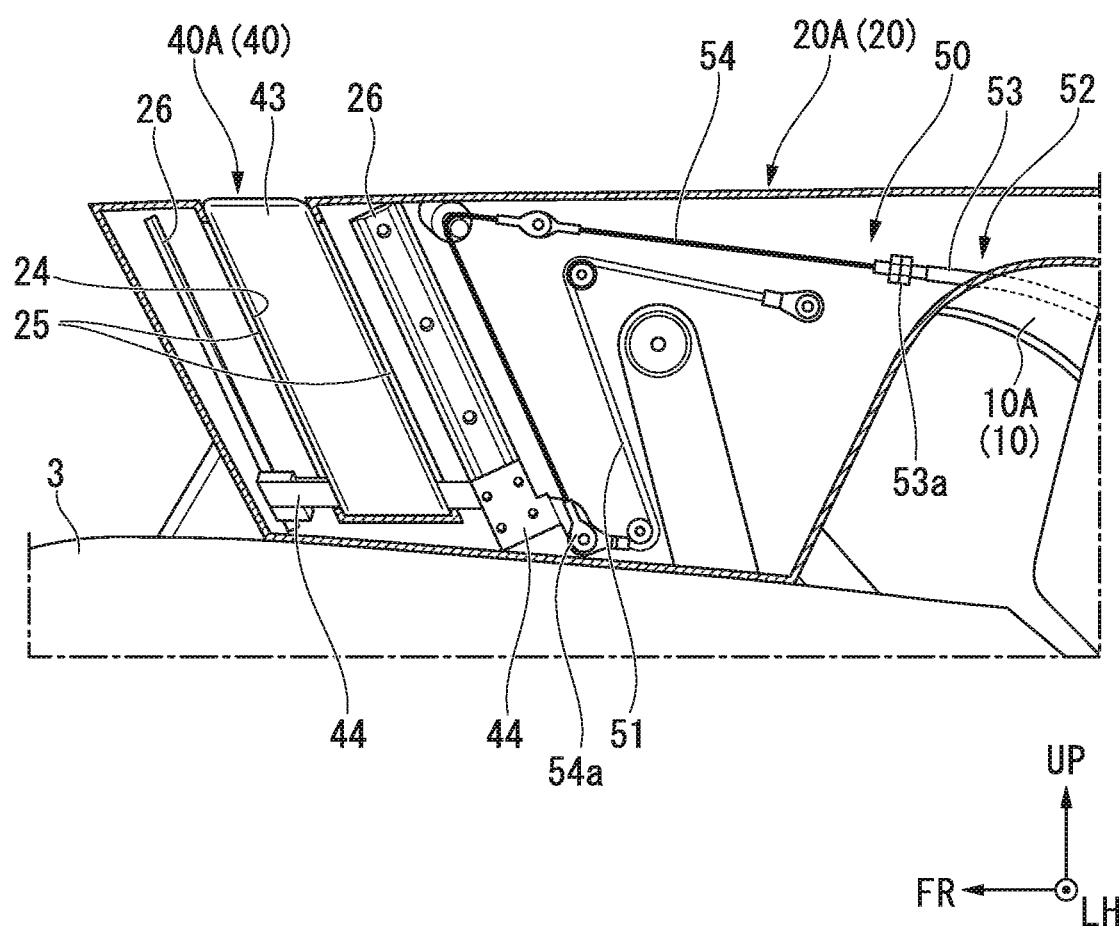
FIG. 4 is a side view showing the internal structure of the right armrest of the embodiment.

FIG. 4 is a side view showing the internal structure of the right armrest 20A of the embodiment.

As shown in FIGS. 3 and 4, the pair of sliders 44 extend forward and backward from a lower end of the lever main body 43. The sliders 44 are inserted through the slits 25 formed in the wall surfaces of the storage part 24 of the armrest 20. Tips of the sliders 44 are slidably supported on the rails 26 inside the armrest 20. Thereby, the steering levers 40 can be made slidable relative to the armrests 20 in the directions in which the storage parts 24 extend. Each of the steering levers 40 is formed to be movable between an operation position (a position of the steering lever 40 shown in FIG. 3) at which the steering lever 40 protrudes upward from the armrest 20 and can be grasped and steered by the driver and a storage position (a position of the steering lever 40 shown in FIG. 4) at which the steering lever 40 is stored in the armrest 20.

As shown in FIG. 1, an upper end 41 of each of the steering levers 40 is bent toward the outside of the seat 1 in the leftward and rightward direction. An operating means 42 is provided on an upper end face (a tip surface) 40a of each of the steering levers 40. The operating means 42 performs operations other than the change operation of the steering angle. The operations other than the change operation of the steering angle are, for instance, operations of a navigation device, an audio device, and so on. The operating means 42 includes, for instance, a trackpad, a switch, and so on. The upper end face 40a of each of the steering levers 40 is flush with the upper surface 21a of the top wall part 21 of the armrest 20 at the storage position, and is exposed at the top (see FIG. 5). Thereby, the operating means 42 can also be operated in a state in which the steering lever 40 is located at the storage position.

Figure 5:
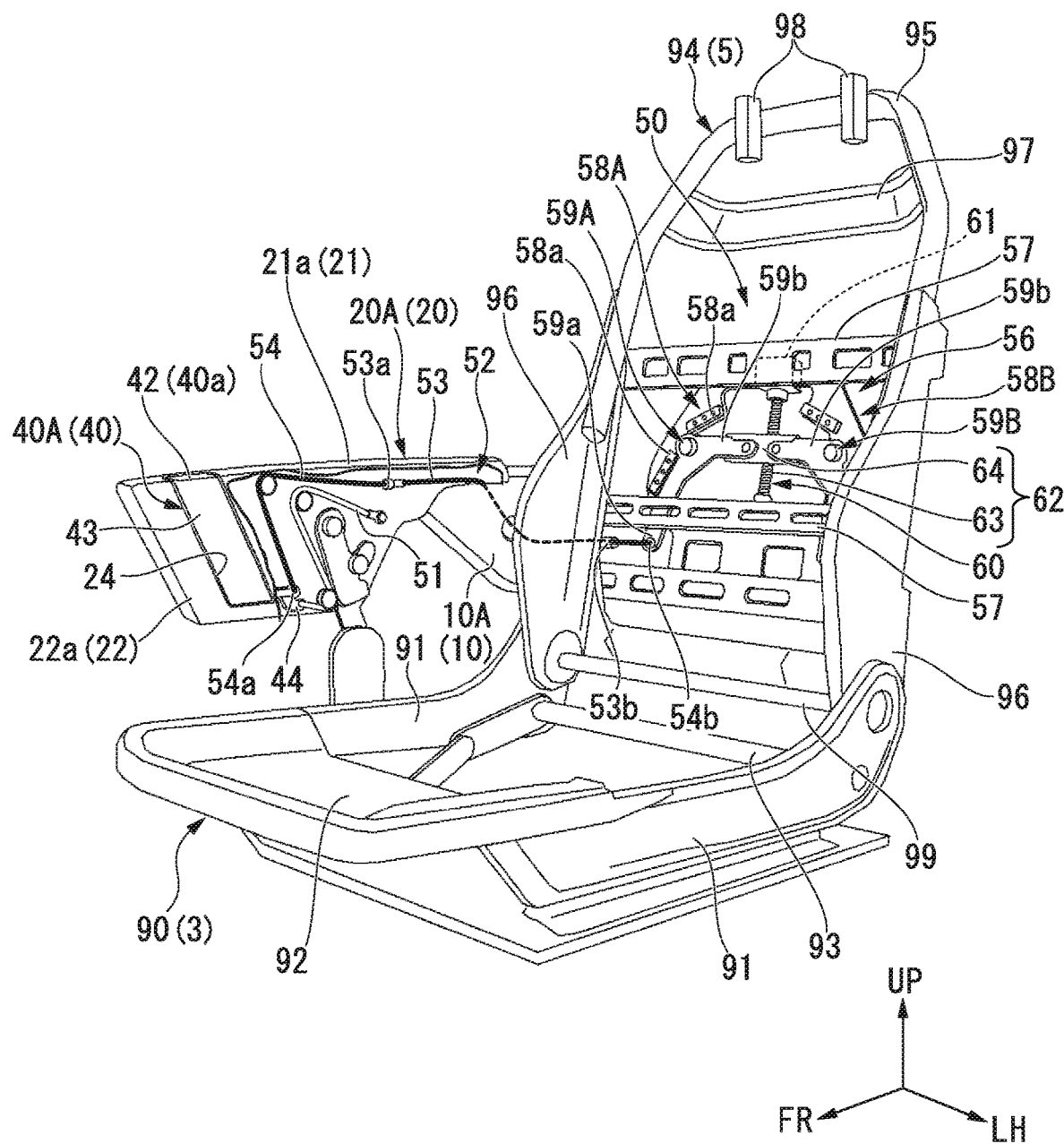
FIG. 5 is a perspective view showing an internal structure of the seat of the embodiment.

FIG. 5 is a perspective view showing an internal structure of the seat 1 of the embodiment.

As shown in FIGS. 2 and 5, the elevating means 50 displaces the steering levers 40 between the operation position and the storage position. The elevating means 50 displaces the pair of steering levers 40A and 40B at the same time. The elevating means 50 includes biasing members 51, cables 52, and a winding unit 56.

As shown in FIG. 2, one of the biasing members 51 is provided for each of the steering levers 40 (only the biasing member 51 provided on the right steering lever 40A is shown in each figure). The biasing members 51 bias the steering levers 40 from the operation position toward the storage position. The biasing members 51 are, for instance, rubber cords.

The cables 52 connect the steering levers 40 and the winding unit 56. One of the cables 52 is provided for each of the steering levers 40. Each of the cables 52 includes an outer cable 53 and an inner cable 54. The outer cable 53 is formed in a tubular shape, and is fitted onto the inner cable 54. The outer cable 53 extends from the inside of the armrest 20 to the inside of the seat back 5 through the inside of the base member 10. A first end 53a of the outer cable 53 is disposed to face an upper portion of the storage part 24 from the back inside the armrest 20, and is fixed to the armrest 20. A second end 53b of the outer cable 53 is disposed to face a middle side of the seat 1 in the leftward and rightward direction inside the seat back 5 when viewed in the forward and backward direction, and is fixed to the back frame 94.

The inner cable 54 is inserted into the outer cable 53. A first end 54a of the inner cable 54 is connected to the slider 44 on a rear side of the steering lever 40 inside the armrest 20. A second end 54b of the inner cable 54 is connected to the winding unit 56 inside the seat back 5. The inner cable 54 is disposed inside the armrest 20 such that the second end 54b is pulled up, and thereby the first end 54a pulls up the slider 44 on the rear side of the steering lever 40 in a sliding direction of the steering lever 40. That is, the second end 54b is pulled, and thereby the inner cable 54 displaces the steering lever 40 from the storage position toward the operation position against a biasing force of the biasing member 51.

The winding unit 56 pulls the second ends 54*b* of the inner cables 54 of the pair of cables 52. The winding unit 56 includes a pair of stays 57 that are fixed to the back frame 94 of the seat back 5, a pair of arm supports 58A and 58B that are fixed to the pair of stays 57, a pair of link arms 59A and 59B that are rotatably supported by the pair of arm supports 58A and 58B, and a linear actuator (a drive unit) 60 that rotates the pair of link arms 59A and 59B.

The pair of stays 57 extend in the leftward and rightward directions. The pair of stays 57 are laid across the left and right side plates 96 of the back frame 94 at an interval in the upward and downward direction.

The pair of arm supports 58A and 58B are disposed at an interval in the leftward and rightward direction. The pair of arm supports 58A and 58B are laid across the pair of stays 57. The pair of arm supports 58A and 58B are a right arm support 58A provided on the right side and a left arm support 58B provided on the left side. Stoppers 58*a*, which come into contact with the link arms 59A and 59B at both ends of the rotating ranges of the link arms 59A and 59B, are provided on the arm supports 58A and 58B. The stoppers 58*a* regulate the rotating ranges of the link arms 59A and 59B.

The pair of link arms 59A and 59B are a right link arm 59A that is rotatably supported by the right arm support 58A, and a left link arm 59B that is rotatably supported by the left arm support 58B. For example, when viewed in the forward and backward direction, the pair of link arms 59A and 59B are formed in line symmetry with respect to a central line of the seat 1. Each of the link arms 59A and 59B includes a first arm 59*a* that extends downward from the center of rotation when viewed in the forward and backward direction, and a second arm 59*b* that extends from the center of rotation toward the middle of the seat 1 in the leftward and rightward direction when viewed in the forward and backward direction.

When viewed in the forward and backward direction, a tip of the first arm 59*a* of the right link arm 59A is disposed on the center side of the seat 1 in the leftward and rightward direction with respect to the second end 53*b* of the outer cable 53 of the cable 52 connected to the right steering lever 40A. The second end 54*b* of the inner cable 54 of the cable 52 connected to the right steering lever 40A is connected to the tip of the first arm 59*a* of the right link arm 59A. When viewed in the forward and backward direction, a tip of the first arm 59*a* of the left link arm 59B is disposed on the center side of the seat 1 in the leftward and rightward direction with respect to the second end 53*b* of the outer cable 53 of the cable 52 connected to the left steering lever 40B. The second end 54*b* of the inner cable 54 of the cable 52 connected to the left steering lever 40B is connected to the tip of the first arm 59*a* of the left link arm 59B.

The linear actuator 60 includes a driving source 61 that generates a rotational driving force, and a ball screw 62 that converts the rotational driving force of the driving source 61 into a linear driving force. The driving source 61 is, for instance, a motor. The driving source 61 is mounted on one of the pair of stays 57, for instance, which is provided on the upper side. The ball screw 62 includes a screw shaft 63 that is rotatably supported by the pair of stays 57, and a nut part 64 that is screwed to the screw shaft 63. When viewed in the forward and backward direction, the screw shaft 63 is disposed, for instance, in the center of the seat 1. When viewed in the forward and backward direction, the screw shaft 63 extends in the upward and downward direction. The screw shaft 63 is connected to the driving source 61 at an upper end thereof, and is rotated due to the rotational driving force of the driving source 61. The nut part 64 rotatably supports tips of the second arms 59*b* of the pair of link arms 59A and 59B. The rotation of the nut part 64 around the screw shaft 63 is regulated by the pair of link arms 59A and 59B. Thereby, when viewed in the forward and backward direction, the nut part 64 moves in the upward and downward direction along with the rotation of the screw shaft 63.

The linear actuator 60 moves the nut part 64 in the upward and downward direction when viewed in the forward and backward direction, and thereby rotates the pair of link arms 59A and 59B. The linear actuator 60 moves the nut part 64 from below toward above, and thereby moves the tips of the first arms 59*a* of the link arms 59A and 59B toward the center side of the seat 1 in the leftward and rightward direction when viewed in the forward and backward direction. Thereby, the linear actuator 60 pulls the second ends 54*b* of the pair of inner cables 54, and raises the pair of steering levers 40A and 40B. As shown in FIG. 5, the linear actuator 60 moves the nut part 64 from above toward below, and thereby moves the tips of the first arms 59*a* of the link arms 59A and 59B toward the outside of the seat 1 in the leftward and rightward direction when viewed in the forward and backward direction. Thereby, the linear actuator 60 makes the pair of inner cables 54 loose, and lowers the pair of steering levers 40A and 40B by means of the biasing members 51.

FIG. 6 is a block diagram showing a constitution of the steering device 9 of the embodiment.

As shown in FIG. 6, the elevation control unit 70 acquires information about the driving state of the vehicle from an automatic driving control unit 100. The elevation control unit 70 controls the linear actuator 60 according to the driving state of the vehicle. The automatic driving control unit 100 is installed in the vehicle. The automatic driving control unit 100 performs switching between the automatic driving and the manual driving. The automatic driving control unit 100 controls the automatic driving during the automatic driving. The automatic driving control unit 100 outputs information about the driving state (the driving mode) of the vehicle as a driving mode signal. The driving state of the vehicle refers to the automatic driving (the automatic driving mode) and the manual driving (the manual driving mode).

When a predetermined condition is established, the elevation control unit 70 disposes the pair of steering levers 40A and 40B at a storage position. In the present embodiment, the predetermined condition is the case in which the driving state of the vehicle is the automatic driving. The elevation control unit 70 determines whether the driving state of the vehicle is the automatic driving or the manual driving, on the basis of the driving mode signal output from the automatic driving control unit 100. To be specific, the elevation control unit 70 controls the linear actuator 60 as follows. When the driving state of the vehicle is the manual driving, the elevation control unit 70 controls the driving source 61 to raise the nut part 64 of the ball screw 62 as shown in FIG. 2. When the driving state of the vehicle is the automatic driving, the elevation control unit 70 controls the driving source 61 to lower the nut part 64 of the ball screw 62 as shown in FIG. 5. Thereby, the pair of steering levers 40A and 40B are disposed at an operation position during the manual driving, and at a storage position during the automatic driving.

Hereinafter, an operation and effects of the steering device 9 of the present embodiment will be described.

(1) In the steering device 9 of the present embodiment, the pair of steering levers 40A and 40B formed to be able to be grasped by the driver are provided on the pair of armrests 20A and 20B. Thereby, the steering device 9 is disposed at a position suitable for the change operation of the steering angle during both the manual driving and the automatic driving of the vehicle. For this reason, while the driver relaxes by leaning back against the seat 1 during the automatic driving, even when the driving state of the vehicle is switched from the automatic driving to the manual driving, the driver can promptly grasp the steering levers 40A and 40B without getting up. Therefore, even when the driving state of the vehicle is changed from the automatic driving to the manual driving, the steering device 9 of the present embodiment enables the driver to instantly cope with this situation.

Further, in the steering device 9 of the present embodiment, the steering levers 40A and 40B are disposed at the storage position when a predetermined condition is established. Thereby, when the predetermined condition is established, the steering levers 40A and 40B can be disposed at a position at which they get out of the way of an occupant. Therefore, the steering device 9 that is out of the way when the driver does not need to operate the steering device can be provided.

(2) In the steering device 9 of the present embodiment, the steering levers 40A and 40B are disposed at the storage position during the automatic driving of the vehicle. For this reason, when the driver does not need to operate the steering device 9 during the automatic driving, the steering levers 40A and 40B are stored. Therefore, it is possible to inhibit the steering levers 40A and 40B from getting in the way during the automatic driving, and to inhibit the occupant from coming into contact with the steering levers 40A and 40B to erroneously operate the steering device 9 during the automatic driving.

(3) The steering device 9 of the present embodiment includes the linear actuator 60 that displaces the pair of steering levers 40A and 40B between the operation position and the storage position. Thereby, the pair of steering levers 40A and 40B can be displaced between the operation position and the storage position by the single linear actuator 60. Therefore, in comparison with a case in which the drive units such as linear actuators are provided on, for instance, the steering levers one by one, the number of components can be reduced.

The present invention is not limited to the above embodiment described with reference to the drawings, and various modifications are conceivable in the technical scope thereof.

For example, in the above embodiment, each of the storage parts 24 is formed in a groove shape, but the present invention is not limited thereto. The storage part may be configured to be formed, for instance, in a hole shape that is open to the upper surface of the top wall part of the armrest to be stored in the armrest by inserting the steering lever.

In the above embodiment, the biasing members 51 are configured to bias the steering levers 40 from the operation position toward the storage position such that the cables 52 pull the steering levers 40 from the storage position toward the operation position. However, without being limited thereto, the biasing members may be configured to bias the steering levers from the storage position toward the operation position such that the cables pull the steering levers from the operation position toward the storage position. In the above embodiment, the biasing members 51 are rubber cords. However, without being limited thereto, the biasing members may be coil springs or the like.

In the above embodiment, the pair of steering levers 40A and 40B are configured to be displaced between the operation position and the storage position by one linear actuator 60, but the present invention is not limited thereto. That is, the drive units such as linear actuators may be provided, for instance, on the steering levers one by one.

In the above embodiment, the driving state of the vehicle is the automatic driving on the condition that the steering levers 40 are disposed at the storage position, but the present invention is not limited thereto. For example, the condition that the steering levers 40 are disposed at the storage position may be a case in which a mode having a high degree of driving assist within the automatic driving is performed. The degree of driving assist is, for instance, a level of liability related to the driving of the vehicle which is required for the occupant of the vehicle. For example, in the mode having a high degree of driving assist within the automatic driving, overall vehicle control is automatically performed, and the liability related to the driving required for the occupant of the vehicle is not generated.

While the preferred embodiment of the present invention has been described, the present invention is not limited to the embodiment. Additions, omissions, substitutions, and other modifications of the constitution are possible without departing from the spirit of the present invention. The present invention is not limited by the above description, and is only limited by the appended claims.

What is claimed is:

1. A steering device comprising:
 a pair of armrests which are mounted on left and right sides of a seat for a vehicle and on which arms of a sitter are placeable; and
 steering members which are respectively provided on the pair of armrests, are formed to be grasped by the sitter, and are configured to change a steering angle of the vehicle by moving in a forward and backward direction of the seat,
 wherein the steering members are formed to be movable between an operation position at which the sitter grasps and operates the steering members and a storage position at which the steering members are stored in the armrests, and are disposed at the storage position when a predetermined condition is established, and
 the steering device further comprises a single drive unit that displaces both the steering members between the operation position and the storage position.

2. The steering device according to claim 1, wherein the steering members are disposed at the storage position during automatic driving of the vehicle.

3. The steering device according to claim 1, wherein the single drive unit is mounted on a back frame of the seat.

4. The steering device according to claim 1, further comprising elevating means that displaces the steering members between the operation position and the storage position, wherein:
 the elevating means includes
  biasing members that bias the steering members from one of the operation position and the storage position toward the other; and
  a winding unit that pulls cables that are connected to the steering members.

5. The steering device according to claim 4, wherein:
 the winding unit includes a pair of link arms that are provided rotatably with respect to a back frame of the seat and are connected to the cables, and the pair of link arms are driven by the single drive unit.

6. A steering device comprising:
a pair of armrests which are mounted on left and right sides of a seat for a vehicle and on which arms of a sitter are placeable; and
steering members which are respectively provided on the pair of armrests, are formed to be grasped by the sitter, and are configured to change a steering angle of the vehicle by moving in a forward and backward direction of the seat, wherein:
the steering members are formed to be movable between an operation position at which the sitter grasps and operates the steering members and a storage position at which the steering members are stored in the armrests, and are disposed at the storage position when a predetermined condition is established,
each of the armrests has a storage part capable of slidably storing the steering members, and
the steering members are formed in a shape that corresponds to a shape of the storage part.

7. The steering device according to claim 6, wherein the steering members are disposed at the storage position during automatic driving of the vehicle.

8. The steering device according to claim 6, further comprising a single drive unit that displaces both the steering members between the operation position and the storage position.

9. The steering device according to claim 8, wherein the single drive unit is mounted on a back frame of the seat.

10. The steering device according to claim 6, further comprising elevating means that displaces the steering members between the operation position and the storage position, wherein:
the elevating means includes
biasing members that bias the steering members from one of the operation position and the storage position toward the other; and
a winding unit that pulls cables that are connected to the steering members.

11. The steering device according to claim 10, wherein:
the winding unit includes a pair of link arms that are provided rotatably with respect to a back frame of the seat and are connected to the cables, and
the pair of link arms are driven by the single drive unit.

* * * * *